June 7, 1938.　　C. P. DEBUCH ET AL　　2,119,528
ROTARY FURNACE
Original Filed Sept. 11, 1934　　4 Sheets-Sheet 1
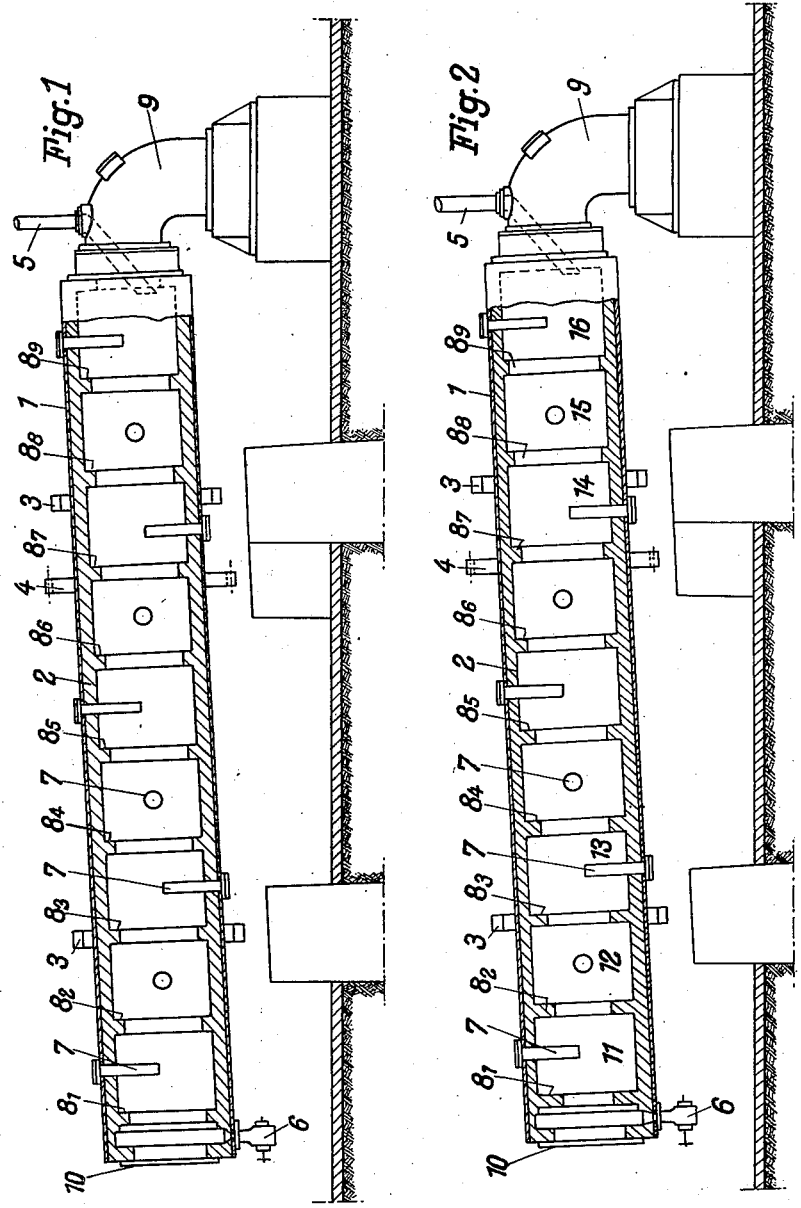
Inventors:
Carl Paul Debuch,
Ernst Markworth
By
Attorney

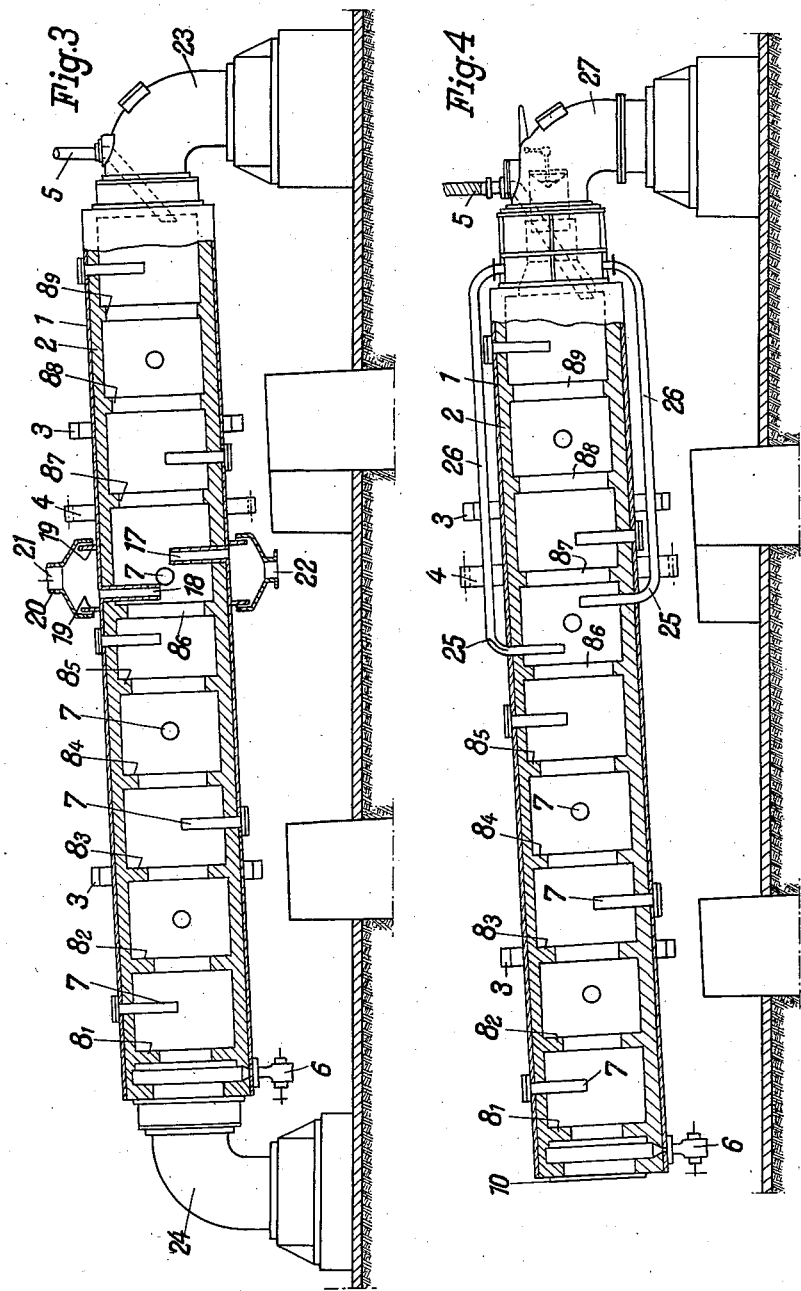

June 7, 1938.  C. P. DEBUCH ET AL  2,119,528
ROTARY FURNACE
Original Filed Sept. 11, 1934   4 Sheets-Sheet 3
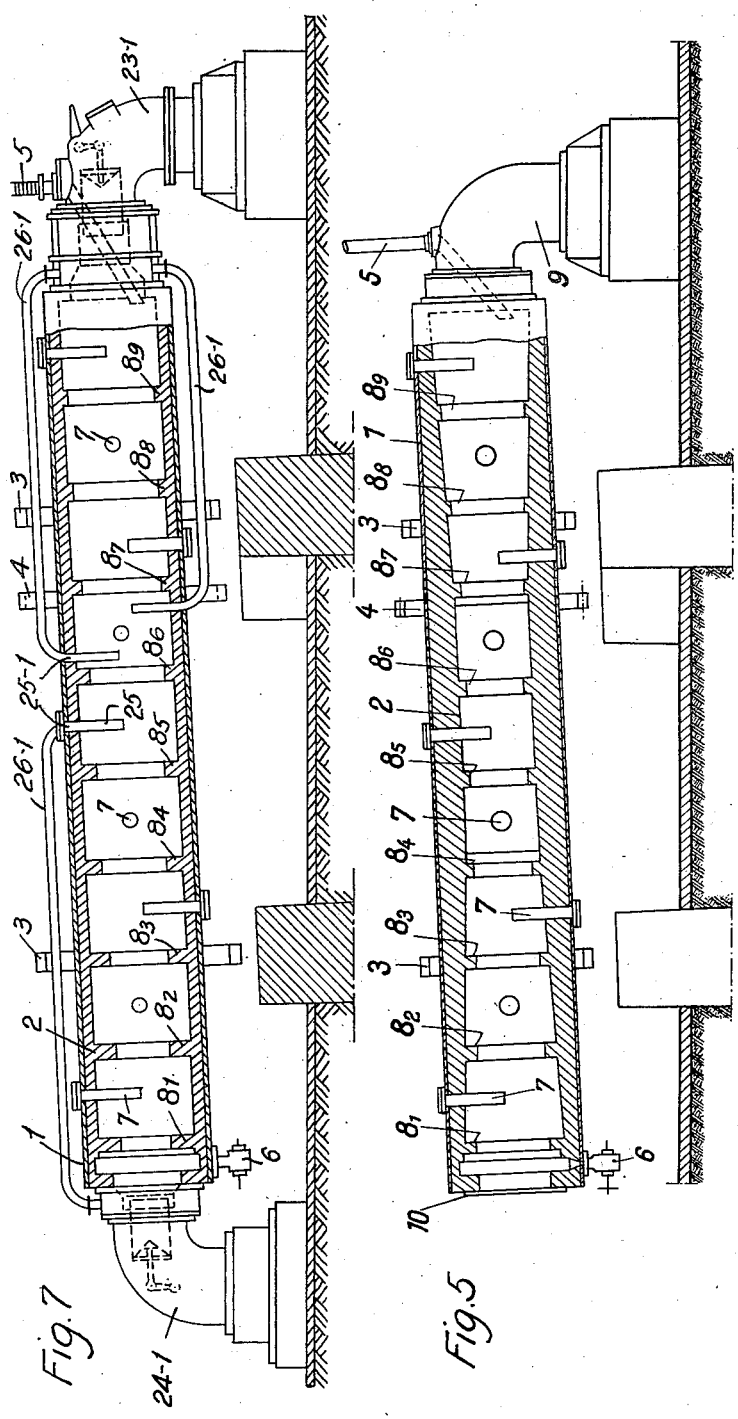
Inventors:
Carl Paul Debuch,
Ernst Markworth
By A. W. Weller
Attorney

UNITED STATES PATENT OFFICE 2,119,528

ROTARY FURNACE

Carl Paul Debuch and Ernst Markworth, Frankfort-on-the-Main, Germany, assignors to American Lurgi Corporation, New York, N. Y., a corporation of New York Original application September 11, 1934, Serial No. 743,511. Divided and this application May 12, 1936, Serial No. 79,256. In Germany May 19, 1934

11 Claims. (Cl. 263—32)

The present invention relates to rotary furnaces, and, more particularly, to rotary furnaces of an improved character for carrying out chemical and metallurgical operations.

It is well known that the use of rotary tubular furnaces for carrying out metallurgical and chemical processes, such as roasting, have the advantage of obtaining a large output with a single furnace. Numerous endeavors have been directed to increasing the output of the rotary tubular furnace. Many difficulties have been encountered which were due not so much to causes in the metallurgical or chemical operations such as the presence of an undue residual amount of sulphur in the products obtained in roasting pyrites, but rather to the fact that when the output was increased beyond a certain limit, excessively high temperatures occurred in certain zones of the furnace and lead to the formation of incrustations and to other phenomena of sintering. Various proposals have already been suggested to overcome the difficulties of increasing the output of a rotary tubular furnace. Thus, attempts have been made to make the superficial area of the charge exposed to the atmosphere of the furnace as large as possible in relation to the weight of the material under treatment. For the purpose of carrying these attempts into practice, turning devices have been provided in the furnace and the bed of the ore present has been kept as shallow as possible. The purpose of the turning mechanism was to bring the charge into repeated contact with the furnace atmosphere, and, it was believed, that the most advantageous depth of the charge realized by adjusting and correlating the angle of inclination of the furnace, the height of the baffle rings and the revolutions of the furnace in such a manner that the charge passed through the furnace in about 4 to 8 hours. Although various proposals and attempts were made to solve the problem confronting the art none, as far as is known, has been wholly successful and satisfactory when carried into practice.

We have discovered that it is possible to increase the output of rotary tubular furnaces in a surprisingly simple way. It has been found that the quantity of charge material actually present in the furnace has a decisive influence on the operation of the furnace and on its output.

It is an object of the present invention to increase the output of a rotary tubular furnace.

It is another object of the present invention to eliminate detrimental incrustations and sintering phenomena in a rotary tubular furnace.

It is a further object of the invention to provide an improved rotary tubular furnace capable of retaining and treating an increased quantity of charge material.

The invention also contemplates the provision of a furnace head permitting accurate control of the withdrawal of furnace gases from a rotary tubular furnace.

Other objects and advantages will become apparent from the following description taken in conjunction with the accompanying drawings, in which:—

Fig. 1 is a longitudinal sectional view of a rotary tubular furnace of the type used for carrying the present invention into practice;

Fig. 2 illustrates a similar view of a rotary tubular furnace embodying the present invention with baffle rings of different heights;

Fig. 3 depicts the novel rotary furnace with a head at both of its ends and equipped with gas outlets opening into a chamber concentrically surrounding the shell of the furnace.

Fig. 4 depicts a longitudinal sectional view of a similar furnace with openings in the shell, through which gases are led from the furnace.

Fig. 5 shows a similar view of a rotary furnace of varying inner diameter.

Fig. 7 illustrates a longitudinal sectional view of a further modified embodiment of the invention.

Figure 6:
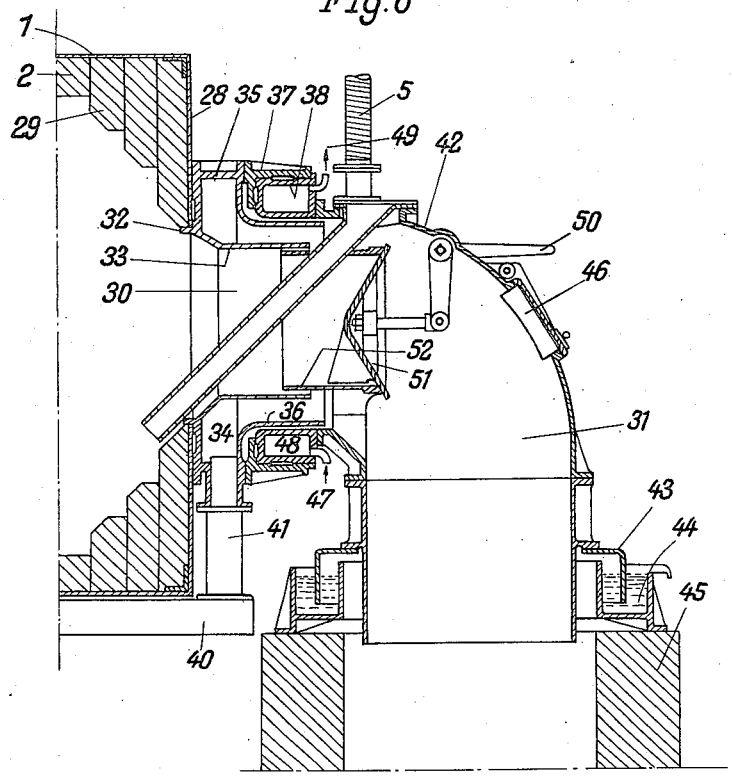
Fig. 6 is the sectional view of a furnace head for withdrawing gas from the furnace.

Broadly stated, the output of a rotary tubular furnace can be increased to a substantial extent by proceeding in accordance with the principles of the present invention. We have discovered that a substantial increase in the output of a furnace can be effected by retaining a critically excessive amount of charge in the furnace. It has been found that a dominant bed amounting to at least about one-half of the daily (24 hours) output of the furnace should be retained within the furnace. Such an excessive bed not only does not interfere with carrying out the metallurgical or chemical reactions completely, but it makes it possible to obtain new and improved results including an increased output, an efficient exchange of heat between the various sections of the furnace, an increased efficiency, a more thorough and uniform conduct of the reactions and the like.

The large and excessive quantity of material necessary for carrying the present method into practice may be retained in the furnace by various means. Thus, for example, the angle of inclination of the furnace may be decreased without modifying the construction of the rotary tubular furnace. It is to be preferred, however, to retain the dominant bed in the furnace by providing baffle rings or plates of special height to divide the furnace into a plurality of sections. The angle of inclination of the furnace can be either maintained or modified (diminished or increased) as desired. The baffle rings may all be of the same height or else of different heights in order to control the quantity of the charge present in the individual sections of the furnace. A structural arrangement of this sort is especially desirable for roasting sulphide ores, such as pyrites. In this case, the height of the baffle rings may be increased either proportionately or according to a definite curve from the upper end or from the reaction zone towards the lower end of the furnace. When roasting sulphidic ores, there are certain zones in the rotary tubular furnace in which the reaction proceeds quickly, and other zones in which the course of the reaction is considerably more sluggish, the latter zones being in most cases situated at the lower end of the furnace. When treating sulfide ores according to the present invention, the height of the baffle rings in the lower sections of the furnace is increased until the amount of the charge which comes into reaction in a unit of time is practically the same in all sections. For example, if in the roasting of pyrites, it has been ascertained that only half as much sulphur is burned off in a unit of time in a section at the lower end of the furnace, raising the height of the baffle rings in the section where the reaction is more sluggish, the quantity of charge in this section can easily be increased to about the double of the quantity present in the other sections where the reaction takes a normal course. In this manner, the quantity of material entering into reaction in a unit of time will be correspondingly larger because the speed (velocity) of the reaction will not be changed much through the increase in the amount of material in that particular section. It has been found that the amount of sulphur burned off in a unit of time in the section under consideration will be practically the same as in the other sections and the working temperature in this section will adjust itself to about the same level as in the other sections.

Generally, it is advisable to maintain constant gas velocities in rotary tubular furnaces. When carrying the present method into practice a larger amount of reactive gases than usual must be supplied to each section of the furnace. In some cases, this requirement can be fulfilled only by increasing the velocity of the gases in the furnace above the velocity found to be the most suitable. The present invention overcomes this difficulty and assures an adequate supply of gas to all parts of the furnace, by leading a portion of the gases through openings or ports provided in the shell of the furnace and conducting them into pipes connected with said ports and located outside the furnace. The amount of gas which is withdrawn can always be so adjusted that at practically all times the most advantageous gas velocity is maintained within the furnace.

In many cases, it is of great importance to be able to control the flow of the gases through the furnace by means of a single device. According to the present invention, this can be easily accomplished, without interfering with the possibility of individually controlling the several currents of gas withdrawn from the furnace, by providing the furnace with a special head consisting essentially of a central passage and of an annular passage surrounding same. The gases are withdrawn through the central passage of this device which is located in front of one end of the furnace. The pipes through which the gases are tapped from the different zones of the furnace are connected with the annular passage. Control devices are provided in the central passage of the furnace head and, in case of need, also in the pipes. The annular and the central passages in the furnace head open into the same gas compartment that houses the equipment for conveying the gas. This arrangement makes it possible to control accurately and independently each partial gas current. Furnace heads of this type may, of course, be provided at each end of the furnace in which case in one portion of the furnace the gas can be passed in the direction followed by the charge material, and in the other portion of the furnace in the opposite direction. In addition, gas may be withdrawn through the openings or ports in the shell and the flow of gas and the temperatures in all sections of the furnace can be influenced or controlled as desired. In many cases, however, one such furnace head will suffice. In this case, it is possible not only to operate the furnace on the parallel flow or on the counter-flow principle, but also to control the flow of gas in the individual sections of the furnace by withdrawing gas through the shell.

The supply of gas to the furnace may be controlled in any well known manner, such as by means of openings at one or both ends of the furnace. In place of or in addition to said openings, of course, gas intakes may be provided, uniformly or distributed in any other way over the surface of the furnace.

In the drawings the reference character 1 designates a shell of the furnace which is provided with masonry 2, runners 3, a drive 4, a charging device 5, and an outlet 6. Nozzles 7 are provided in the furnace for introducing air or other gases needed for reactions. Within the furnace a plurality of baffle rings 8—1, 8—2, 8—3, 8—4, etc. are provided.

Referring more particularly to Fig. 1, a furnace is illustrated with baffle rings of such dimensions as to retain as a dominant bed the desired quantity of material. For example, a dominant bed of about ¾ to about 1½ times the daily (24 hours) output of a furnace, which may have the usual angle of inclination. All of the baffle rings are of the same height and are uniformly spaced so that the sections are of approximately equal length and accommodate approximately equal quantities of material. The gases are withdrawn from the furnace through a head 9. At the other end, the furnace is closed, for example, by a cover 10. This cover, if desired, may be provided with nozzles for the admission of air or other reactive gases. A furnace of this type can be employed to advantage, for example, for treating materials in which the constituents undergoing conversion react at approximately the same rate in all parts of the furnace.

Fig. 2 illustrates a modified furnace which is quite similar to the one shown in Fig. 1. The height of the baffle rings, however, increases from the right hand end of the furnace to the left hand end. Thus, it will be observed that rings 8—1, 8—2, 8—3 are rather higher than rings 8—7, 8—8 and 8—9. Due to this arrangement substantially larger quantities of the charge material are retained in sections 11, 12 and 13 than in sections 14, 15 and 16.

It has been found that the modified furnace is especially suitable for roasting pyrites, zinc blends and other materials in which the reaction proceeds very rapidly at first and much slower afterwards. When these materials are treated in the present furnace, the lower sections thereof hold substantially larger quantities of the charge than the upper sections and, although the reaction has a much slower rate towards the lower end of the furnace, still the amount of the material undergoing conversion and the heat liberated per unit of time will be approximately the same in all sections of the furnace. Similar results have been obtained with the furnace depicted in Fig. 5 in which the diameter of the free space is larger towards both ends than in the center. This construction can be obtained, for example, by tapering the thickness of the lining from the center towards the two ends. The height of the baffle rings 8 is less in the upper part (right hand end) of the furnace than in the lower part (left hand end). The height of the lower rings is at least such that the imaginary line passing through their upper edges is approximately parallel to the axis of the furnace and about flush with or projecting beyond the upper edges of the baffle rings in the central zone. By means of these arrangements, it is possible to control and vary in any desired manner, the rate of movement of the material through the different zones of the furnace and the quantity of material retained in the various sections.

The rate of the reaction in the individual sections of the furnace may be modified, influenced or controlled by structural arrangements shown in Figs. 3 and 4. With these arrangements the reaction is controlled by a suitable adjustment of the flow, velocity, and quantity of the gases in the furnace. In Fig. 3, two gas outlets are designated by reference characters 17 and 18 which open into a chamber concentrically surrounding the shell of the furnace. Each gas outlet consists of rotative members 19 which rotate with the furnace and a stationary member 20 which is provided with a gas exhaust 21 and a device 22 for removing the dust deposited by the gases. The furnace of this type permits the withdrawal of gas at a number of points, to wit: through the two furnace heads 23 and 24 and through the gas outlets 17 and 18. The number of these gas outlets may be further increased, for example, by providing similar gas outlets which extend through the shell in other sections bounded by two baffle rings.

By controlling the gas supply through nozzles 7 and by suitable adjustment of the control devices for the three or more gas outlets of the furnace, it is possible either to withdraw equal quantities of gas of approximately the same composition through all of the gas outlets or else to withdraw a different volume and composition of gases at each outlet. Obviously, the individual currents or streams of gas may be reunited outside the furnace. Each gas current or stream may be individually put to further use or each may be treated separately or some or all of the gas streams may be run to waste. For removing dust from some or all of the gas streams issuing from the furnace suitable dust separating or collecting devices may be employed. A certain quantity of dust from the gas may be deposited in the concentric chamber formed by the members 19 and 20. For the purpose of removing the thus deposited dust, the chamber is provided with a dust outlet 22 having a removable cover.

The rotary tubular furnace illustrated in Fig. 4 is provided with one or more openings or ports 25 in the shell through which the gases are led from the furnace. These openings may be incorporated in several sections of the furnace or kiln. The gases issuing from the furnace through said openings are conducted by pipes 26 to a furnace head 27 in which they are re-united with the gases flowing directly to the head from the furnace.

Fig. 7 illustrates a longitudinal sectional view of another modified embodiment of the invention into a rotary tubular furnace. This furnace is similar to the one shown in Fig. 4 with the difference, however, that a furnace head is provided at each end of the furnace shell, said furnace heads being denoted by reference characters 23—1 and 24—1, respectively. Openings 25—1 are provided in the furnace shell, and, same as in Fig. 4, the gases issuing from the intermediate compartments of the furnace through said openings are conducted by pipes 26—1 to furnace heads 23—1 and 24—1 in which they are re-united with the gases flowing directly to the furnace heads and are withdrawn from the furnace.

In all embodiments control or closure members or valves are provided in each inlet, outlet, pipe, etc. through which gases flow. The members permit each device for admitting or withdrawing the gases to be throttled or completely closed or opened as desired.

In the event that the pipes conveying the gases drawn from the furnace through openings located in the shell open into a furnace head, it is advisable to provide an additional control device in the openings or ports.

An appropriate control device is illustrated in detail in Fig. 6. The upper end of the rotary tubular furnace is partly closed by an annular cover 28 which is protected by a refractory lining 29. In the cover, a central opening 30 is provided for the direct passage of the furnace gases into the furnace head. The head itself consists of a stationary portion 31 and a rotatable portion 32 which rotates with the furnace.

The rotatable portion is composed of a short central pipe 33 through which the furnace gases in the upper end of the furnace escape. This central pipe is surrounded by an annular space 34, bounded externally and laterally by the annular member 35 and an extension pipe 36. This extension serves to protect the packing between members 37 and 38, the stationary and the rotatable parts, respectively, of the furnace head, from becoming overheated by the furnace gases and from fouling by dust carried away by the furnace gases. Connected to the annular space 34 via branch connections 41 are a plurality of pipes 40 through which the gases are withdrawn from parts of the furnace that are remote from the head. According to the particular condition any appropriate number of pipes 40 may be provided.

The stationary part of the furnace head consists essentially of an elbow pipe 42 and of the extension bell 43 attached thereto, which dips into the liquid or sand seal 44 provided on the upper end of the gas main 45. In this manner, the stationary portion of the furnace head has sufficient play to adapt itself to the expansion caused in the furnace by the action of heat.

The elbow pipe 42 of the furnace head is provided with a manhole 46 and a cover for this manhole which can be removed for cleaning purposes. The furnace head also carries a charging device 5, consisting of a feed pipe and a chute extending into the furnace. The packing between the rotative and the stationary parts of the furnace head is preferably equipped with cooling means. For example, cooling water may be introduced at inlet 47 for an annular passage 48 and may be discharged via outlet 49.

The stationary portion 31 of the furnace head is provided with a hood 51 which fits with a certain amount of play into the central gas exhaust 33 and is adapted to be displaced along the longitudinal axis of the furnace by means of a lever mechanism 50. It is to be noted that a perfect tight fit between parts 33 and 51 is not necessary since the rotary tubular furnace will always be operated in such a way that gases flow through pipe 33. These gases pass through the gap between the pipe 33 and the tubular portion 52 of the hood 51 into the elbow pipe of the furnace head to be lead away together with the gases issuing through the annular passage 34. The flow of the gases escaping through the pipe 33 is controlled by adjusting the hood 51 in the pipe 33.

In carrying the present method into practice, in a rotary furnace which is about 2 meters in diameter and 24 meters long, the charge was increased from 7.5 tons according to conventional practice to 20 tons by employing higher baffle rings. This increased quantity corresponds to about two-thirds of the daily output when operated in accordance with prior procedures. The number of baffle rings remained the same, but the first ring in the upper end of the furnace had a height of 50 mm. and the height of each of the succeeding rings was increased uniformly by 50 mm., so that the last ring was 600 mm. high. During the roasting, the furnace temperatures were unexpectedly found to be almost equal throughout the furnace, the temperature being 800° in the first zone, 850° C. in the central zone and 800° in the final zone. The roasted blends had a sulphur content of about 0.8%. Of course, the temperatures may be increased to a certain extent which raised the temperatures to 920° C., 980° C., and 900° C., respectively, in the different zones, and which increased the output to about 36 tons. Naturally, a correspondingly larger quantity of roasting air must be admitted in this case which raises the gas velocity in the furnace from about 1.5 meters per second to about 2.2 meters per second. Since this velocity is higher than one which is preferred for the roasting process, a portion of the volume of gas, for instance, one third, is preferably withdrawn at about the end of the upper third of the furnace and is passed through pipes to the furnace head, where it was united with the main gas stream. In this manner, the velocity of the gas in the upper part of the furnace may be reduced to a desired volume. The two gas streams can be accurately adjusted by means of the valve in the furnace head.

In contrast to the present process, the roasting of zinc blends was conducted in accordance with prior procedures in a conventional rotary tubular furnace which is about 2 meters in diameter, about 24 meters long, and the baffle rings were arranged in the following manner. In the upper third of the furnace, there were 3 baffle rings about 150 mm. in height; in the central third 5 rings of the same height; and in the final third 4 rings of the same height. The baffle rings were spaced at approximately equal distances. Each of the resulting sections between baffle rings held about 625 kgs. of blends so that the total charge in the furnace was about 7.5 tons. The output of the furnace per day (24 hours) was about 30 tons of blends containing 30% of sulphur and the charge retained in the furnace was equivalent to one fourth of the daily output. When carrying out the roasting process, a temperature of about 1000° C. was attained in the upper part of the furnace at which temperature there was a tendency for incrustations to occur. In the central zone the temperature was around 800° C. and in the last third of the furnace, it was below 600° C. At these low temperatures dead-roasting of the zinc blends was naturally impossible. The volume of gas was estimated at about 80,000 cubic meters with a sulphur content of about 6% giving an effective maximum gas velocity of about 1.5 meters per second at a furnace temperature of about 800° C.

Assuming that in a rotary tubular furnace provided with turning devices, the reactions are especially accelerated by the repeated descent of the charge through the gas space of the furnace, the efficient balance of temperature realized by the present invention may possibly be explained in part by the fact that the charge material descending through the gas space mingles with comparatively large quantities of the material as soon as it returns to the dominant bed of ore present in the furnace. The accelerating effect of the movement of the charge material through the free space of the furnace is therefore transmitted to a larger amount of material in interior of which the opportunity for a considerable rise in temperature is not so great as in shallower layers of material in which latter case the material is able to come into more intimate contact with the furnace gases.

Although the present invention has been described in conjunction with certain preferred embodiments, it is to be observed that variations may be resorted to by those skilled in the art without departing from the scope and spirit of the invention as defined by the appended claims.

The present application is a division of our co-pending application, Serial No. 743,511, filed on September 11th, 1934, now Patent 2,062,869, and entitled "A method of conducting chemical and metallurgical operations in a rotary furnace."

We claim:—

1. A furnace comprising a rotatable shell, a furnace head mounted at least at one end of said shell, a central passage in the furnace head through which gases are withdrawn directly from the furnace, exhaust ports situated on the shell, pipes mounted on the shell and connected to said exhaust ports, an annular passage in the furnace head connected with said pipes, a throttle member in the central passage for controlling the gas current therein, and a main gas outlet for simultaneously withdrawing gases from said central and from said annular passage.

2. A furnace comprising a rotatable shell, a furnace head mounted at each end of said shell, each of said heads having a rotatable part attached to the shell, a central passage in each furnace head through which gases are withdrawn directly from the furnace, exhaust ports situated on the shell, pipes mounted on the shell and connected to said ports, an annular passage in each furnace head connected with said pipes, a throttle member in each central passage for controlling the gas currents and a stationary part for each of said furnace heads and including a main gas outlet for simultaneously withdrawing gases from said central and from said annular passage.

3. A furnace for treating ore comprising a rotary shell, means for feeding ore to be treated to the interior of said shell, means for discharging treated ore therefrom, and rings associated with the inner surface of said shell dividing the interior of the furnace into several sections, the rings in the lower part of the furnace being higher than those in the upper part thereof.

4. A furnace for treating ore comprising a rotary shell, means for feeding ore to be treated to the interior of said shell, means for discharging treated ore therefrom, and rings associated with the inner surface of said shell dividing the interior of the furnace into several sections, the height of said rings increasing from a certain part of the furnace towards the lower end thereof.

5. A furnace for treating ore comprising a rotary shell, means for feeding ore to be treated to the interior of said shell, means for discharging treated ore therefrom, rings associated with the inner surface of said shell dividing the interior of the furnace into several sections, the height of the rings increasing from a certain part of the furnace towards its lower end, and a plurality of openings, distributed over the length of the furnace, through which gases are admitted into the furnace.

6. A furnace for treating ore comprising a rotary shell, means for feeding ore to be treated to the interior of said shell, means for discharging treated ore therefrom, rings associated with the inner surface of said shell dividing the interior of the furnace into several sections, the height of the rings increasing from a certain part of the furnace towards its lower end, and a plurality of openings distributed over the length of the furnace through which roasting air is admitted into the furnace.

7. A furnace for treating ore comprising a rotary shell, means for feeding ore to be treated to the interior of said shell, means for discharging treated ore therefrom, rings associated with the inner surface of said shell dividing the interior of the furnace into several sections, the height of the rings increasing from a certain part of the furnace towards its lower end, and a plurality of openings, distributed over the length and the circumference of the furnace, through which gases are admitted into the furnace.

8. A furnace for treating ore comprising a rotary shell, means for feeding ore to be treated to the interior of said shell, means for discharging treated ore therefrom, and rings associated with the inner surface of said shell dividing the interior of the furnace into several sections, the height of said rings increasing by steps from one end of said furnace to the other end thereof.

9. A furnace for treating ore comprising a rotary shell, means for feeding ore to be treated to the interior of said shell, means for discharging treated ore therefrom, and rings associated with the inner surface of said shell dividing the interior of the furnace into several sections, the height of said rings increasing by equal steps from one end of said furnace to the other end thereof.

10. A furnace for roasting ores comprising a rotary shell, means for feeding ore to be roasted to the interior of said shell, means for discharging roasted ore therefrom, and a plurality of rings spacedly mounted within the interior of said shell and dividing same into sections, said rings having a height increasing from the upper end of said furnace to the lower end thereof and being adapted to retain increasing charges of ore in the corresponding sections.

11. A furnace for roasting sulphidic ores comprising a shell rotatably mounted in a slightly inclined position, means for feeding ore to be roasted to the interior of said shell, means for discharging roasted ore therefrom, and a plurality of rings spacedly mounted within the interior of said shell and dividing same into sections, the height of said rings increasing from the upper end of said furnace to the lower end thereof and being so determined that the charge retained in the individual sections defined by said rings will be substantially in inverse ratio to the speed of the reaction in such section.

CARL PAUL DEBUCH.
ERNST MARKWORTH.